No. 891,506.  
PATENTED JUNE 23, 1908.  
W. W. SPRAGUE.  
COW MILKING MACHINE.  
APPLICATION FILED APR. 27, 1907.
2 SHEETS—SHEET 1.
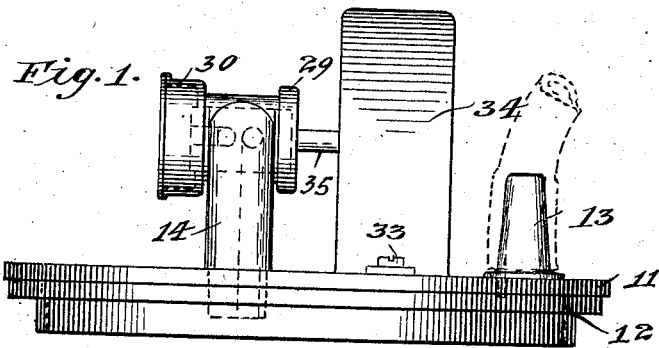
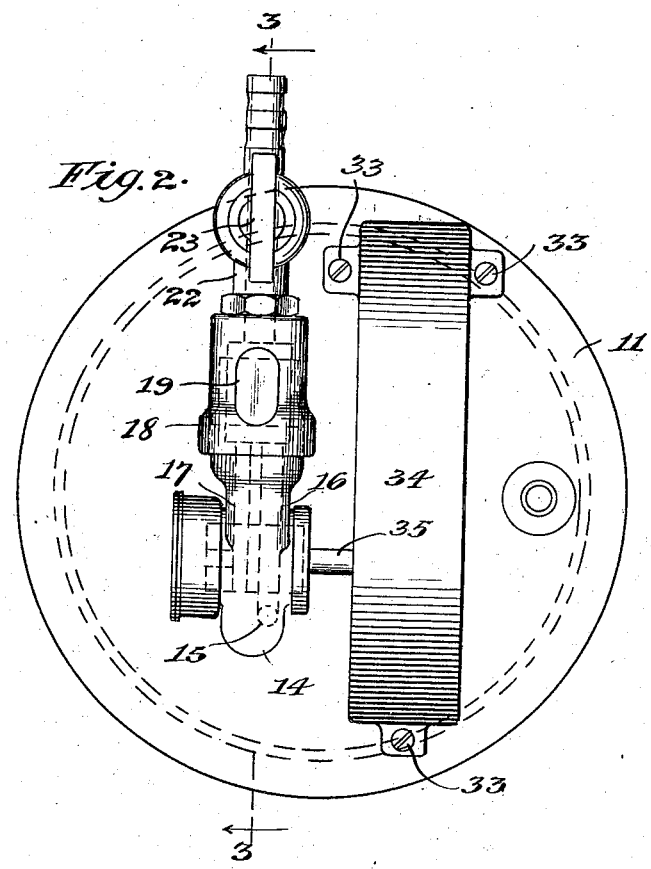

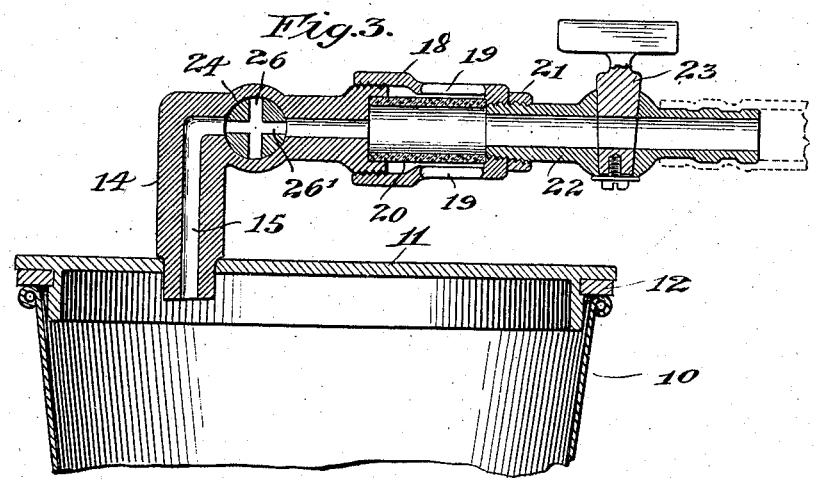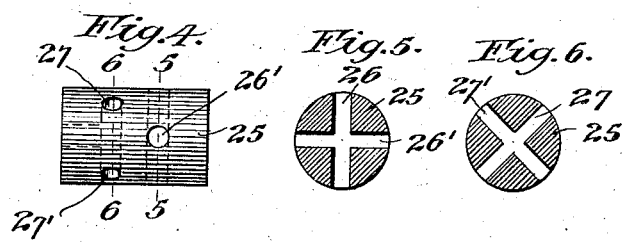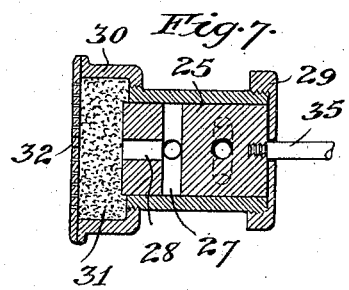

UNITED STATES PATENT OFFICE.

WILLIAM W. SPRAGUE, OF MONMOUTH, MAINE.

COW-MILKING MACHINE.

No. 891,506.  Specification of Letters Patent.  Patented June 23, 1908.

Application filed April 27, 1907.  Serial No. 370,609.

*To all whom it may concern:*

Be it known that I, WILLIAM W. SPRAGUE, a citizen of the United States, residing at Monmouth, in the county of Kennebec and State of Maine, have invented certain new and useful Improvements in Cow-Milking Machines, of which the following is a specification.

This invention relates to cow-milking machines of that type employing a vacuum apparatus operating in connection with a pulsating mechanism through suitable flexible tubes and teat-cups to produce the flow of milk through alternate suctions and lapses upon the teats and udder of the animal; and the invention pertains more especially to a novel and simplified pulsating mechanism.

Most, if not all, of the successful cow-milking machines at present in use employ some form of pulsating mechanism in order to simulate, as closely as possible, the suck and lapse of the calf, or the squeezing and relaxing action of the hand, in the milking operation; and many such mechanisms have been devised, some of which are mechanically and others pneumatically operated. But such devices as are now known are of complicated structure, difficult to keep clean, costly to manufacture, and liable to disarrangement; and the principal object of my present invention is to produce a simple and inexpensive device of this nature, reliable and efficient in action, and easy to keep clean and sanitary; and to this end the invention consists in an apparatus constructed and operating substantially as and upon the principle of the mechanism disclosed in the accompanying drawings and defined in the appended claims.

My invention, in its preferred mechanical form as hereinafter described, comprehends, as its novel element, the feature of a rotary valve provided with two ports or groups of ports so arranged and disposed between and relatively to the teat-cups, the source of suction, and the atmosphere, as to produce, under continuous rotation thereof, alternating suction and relief effects on the teats of the animal, and will be readily understood when considered in connection with the accompanying drawings, in which,—

Figure 1 is an elevational view of my apparatus as applied to the lid or cover of a milk pail. Fig. 2 is a top plan view of the same. Fig. 3 is a vertical section on the line 3—3 of Fig. 2. Fig. 4 is a detail elevation of a rotary valve. Figs. 5 and 6 are cross-sections on the lines 5—5 and 6—6, respectively, of Fig. 4. Fig. 7 is a longitudinal sectional view through the valve and valve-casing.

Referring to the drawings, 10 may indicate the upper portion of a milk pail, and 11 the lid or cover secured thereon with an intervening gasket 12 to secure a substantially air-tight joint. Tapped in the cover 11 at one side thereof is a nipple 13 adapted for connection to a suitable hose leading to a vacuum chamber or other source of suction. Tapping the cover 11 at another point therein is an elbow pipe section 14 (Fig. 3), the vertical member of which has a single duct 15 communicating with the milk pail, while the horizontal member is provided with a pair of parallel ducts 16 and 17, the former of which connects with the vertical duct 15 to effect a continuous passage. Threaded onto the end of the horizontal member of the elbow-pipe is a coupling sleeve 18 having one or more sight openings 19 formed therein to permit observation of the flow of milk through a section of glass tubing 20 lying within the said sleeve. Threaded into the forward end of the sleeve 18 and secured thereon as by a lock-nut 21 is a nipple-member 22 adapted for connection with a suitable hose leading to the usual teat-cups, and further provided with a stop-cock 23.

In the horizontal member of the elbow-pipe 14 is formed a circular horizontal valve-seat 24, within which is fitted a circular valve-body 25. This valve is interposed between the adjacent ends of the duct 15 on the one side and the parallel ducts 16 and 17 on the other, and is provided with two pairs of crossed ports located side by side and disposed, respectively, in the planes of the bores or ducts 16 and 17. The two ports of each pair are disposed at right angles to each other, as illustrated in the detail views, Figs. 5 and 6, each port extending entirely through the valve-body transversely thereof; and the two pairs of ports are relatively so disposed as to make one pair 45 degrees ahead of or behind the other pair, as is also clearly shown in Figs. 4, 5 and 6. The ports that are adapted to register with the duct 16 which communicates with the milk pail are designated by 26 and 26', while the corresponding ports of the other pair are designated by 27 and 27'. The valve-body is still further provided with a short axial port 28 (Fig. 7) that leads from the outer end of the valve-body into and communicates with the intersection of the ports 27 and 27', so that both of said ports are constantly in communication with the axial port 28. The inner end of the housing of the valve-seat is covered by a centrally apertured cap 29 threaded thereon, as shown in Fig. 7; while a similar cap 30 is threaded onto the opposite end of the valve-casing or housing and is adapted to contain a body of cotton 31 which may be confined therein by an apertured covering disk 32, and constitutes a filter or strainer for the air passing therethrough, as more particularly hereinafter described.

Secured on the lid 11 of the milk pail as by screws 33 (Figs. 1 and 2) alongside of the elbow-pipe 14, is a spring motor conventionally illustrated at 34. This motor may be similar to an ordinary spring-actuated clock mechanism, with the gears and pinions so proportioned as to impart to the motor-driving shaft indicated at 35 a continuous rotation at a proper speed suitable for the purpose of the apparatus, which speed may, if desired, be automatically regulated by a suitable automatic governor (not shown); these devices being matters of common knowledge and well understood. The driving shaft 35 is directly secured to the inner end of the rotary valve-body 25, as clearly shown in the detail view, Fig. 7.

In the operation of the apparatus, the teat-cups are applied, the nipple 13 is placed in communication with the vacuum reservoir or other source of suction, the stop-cock 23 is opened, and the motor 34 is started in operation. The continuous rotation of the valve 25 first places the teat-cups in communication with the vacuum through one of the ports 26 or 26', say the latter, as shown in Fig. 3, thus starting the flow of milk, which is quickly followed by an interruption of the suction, as the port 26' passes out of registration with the bore or duct of the elbow pipe 14 in which it is mounted. Upon the instant that the suction is interrupted, the port 27' comes into register with the duct 17, whereby atmospheric air enters through the cap 30 and port 28, to relieve the partial vacuum existing in the teat-cups and tubes, thus producing a lapse. This relief is, however, of such a brief duration that the vacuum in the teat-cups and tubes is not reduced to such a point as to release the former from the teats. The relief produced by the admission of atmospheric air is instantly followed by another suction effect caused by the registration of the port 26 with the duct 15, which is in turn instantly followed by another lapse or relief effect produced through the registration of the port 27 with the air-port 17. The continuous rotation of the valve 25 in one direction thus sets up these repeatedly alternating suction and relief effects, which produces a flow of milk after the fashion of the suck and lapse of the calf, or the squeezing and relaxing action of the hand, which flow of milk may be observed through the openings 19 and glass tube 20, so as to shut off the operation of the apparatus as soon as the milk has been exhausted from the udder.

The apparatus is readily cleansed by simply placing the teat-cups in hot water and setting the apparatus in operation, which produces a flow of hot water through the various tubes and parts in contact with the milk, thereby cleansing the latter.

From the foregoing it will be seen that the described apparatus produces the pulsating effect now regarded as essential in all successful cow-milking machines in a very simple manner and by very simple mechanism, requiring no delicate adjustments and no complicated mechanism for actuating the pulsator.

It will be apparent to those skilled in the art that the particular forms, proportions and relative arrangements of parts as herein disclosed is not essential to the successful working of the apparatus, but may be varied considerably without departing from the principle of the invention or sacrificing any of the advantages thereof.

I claim:

1. In a cow-milking machine, the combination with a milk receptacle, and a cover therefor, of a teat-cup connection to said receptacle through said cover, a suction connection to said receptacle through said cover, a rotary two-way valve interposed in and across said teat-cup connection adapted to place the latter alternately in communication with the suction and the atmosphere, and a motor mounted on said cover connected to and continuously rotating said valve in one direction, substantially as described.

2. A pulsating mechanism for cow-milking machines, comprising a pipe-section adapted for connection at one end to the milk receptacle and at the other end to a conductor leading from the teat-cups, said pipe-section having a main duct establishing communication between said conductor and milk receptacle, a valve-seat formed transversely of said main duct, and a relief duct between said valve-seat and said conductor, a rotary valve lying in said valve-seat and provided with separate ports adapted to alternately open said main duct and connect said relief duct with the atmosphere, and a motor for rotating said valve, substantially as described.

3. A pulsating mechanism for cow-milking machines, comprising a pipe-section adapted for connection at one end to the milk receptacle and at the other end to a conductor leading from the teat-cups, said pipe-section having a main duct establishing communication between said conductor and milk receptacle, a valve-seat formed transversely of said duct, and a relief duct between said valve-seat and said conductor, a rotary valve lying in said valve-seat and provided with a transverse port adapted to register with said main duct and also with a relief port communicating at one end with the atmosphere and at the other end adapted to register with said relief duct alternately with the registration of said transverse port with the main duct, and a motor for rotating said valve, substantially as described.

4. A pulsating mechanism for cow-milking machines, comprising an elbow pipe-section the lower end whereof is adapted for connection to the cover of the milk receptacle and the other end whereof is adapted for connection to a tube leading from the teat-cups, said pipe-section having a main duct extending entirely therethrough, a circular valve-seat formed across said main duct and open at one end to the atmosphere, and a relief duct connecting said valve-seat with the conductor end of said pipe-section, a rotary valve lying in said valve-seat, said valve being provided with a pair of intersecting transverse ports adapted to be alternately brought into register with said main duct, and with another pair of intersecting transverse ports adapted to register with said relief duct, and an axial port communicating therewith at their point of intersection, one of said pairs of transverse ports having an angular lead over the other, and a motor imparting a continuous rotation in one direction to said valve, substantially as described.

5. A pulsating mechanism for cow-milking machines, comprising a pipe-section adapted for connection at one end to the milk receptacle and at the other end to a conductor leading from the teat-cups, said pipe-section having a main duct extending entirely therethrough, a circular valve-seat formed across said main duct, and a relief duct connecting said valve-seat with the conductor end of said pipe-section, a rotary valve lying in said valve-seat and provided with suction and relief ports adapted to alternately establish communication of said main and relief ducts with the milk receptacle and the atmosphere, respectively, an air filter covering the outer end of said relief port, and a motor for rotating said valve, substantially as described.

WILLIAM W. × SPRAGUE.
his mark

Witnesses:
SIMON CLOUGH,
A. M. TRASK.